United States Patent [19]

le Fur et al.

[11] 4,425,496

[45] Jan. 10, 1984

[54] REMOVAL OF METAL COATING FROM DIELECTRIC MATERIAL

[75] Inventors: Daniel le Fur; Robert Haug; Max Goldman, all of Gif sur Yvette, France

[73] Assignee: Electricite de France Service National, Paris, France

[21] Appl. No.: 150,367

[22] Filed: May 16, 1980

[30] Foreign Application Priority Data

May 25, 1979 [FR] France .................. 79 13395

[51] Int. Cl.³ .................. G01K 1/08; H05B 7/18
[52] U.S. Cl. .................. 219/384; 219/68; 219/69 R; 219/69 M; 219/121 PE; 204/164
[58] Field of Search .................. 219/121 PE, 384, 383, 219/69 R, 69 D, 69 M, 69 V, 68, 121 EK; 204/298, 192 E, 164; 250/542, 531, 532

[56] References Cited

U.S. PATENT DOCUMENTS

| | | | |
|---|---|---|---|
| 3,119,919 | 1/1964 | Pratt | 219/384 |
| 3,198,934 | 8/1965 | Dubilier | 219/384 |
| 3,424,895 | 1/1969 | Olson | 219/384 |
| 3,502,845 | 3/1970 | Schirmer | 219/384 |
| 3,754,117 | 8/1973 | Walter | 219/383 |
| 3,895,207 | 7/1975 | Heywang et al. | 219/69 M |
| 3,957,608 | 5/1976 | Streel | 204/164 |
| 3,994,300 | 11/1976 | Siddons | 219/384 |
| 4,056,007 | 11/1977 | Luckan | 204/164 |
| 4,132,613 | 1/1979 | Penfold et al. | 313/210 |
| 4,219,727 | 8/1980 | Bolt | 219/384 |

FOREIGN PATENT DOCUMENTS 2415409 10/1975 Fed. Rep. of Germany ... 219/69 M

*Primary Examiner*—M. H. Paschall
*Attorney, Agent, or Firm*—John T. Synnestvedt; Albert L. Free

[57] ABSTRACT

The metal coating on a dielectric sheet or strip, for instance for use in capacitors, is locally removed by a Corona discharge between the sheet and a point electrode.

A current return electrode contacts the sheet and is located in the return path to a HV generator connected to the point electrode.

5 Claims, 3 Drawing Figures

REMOVAL OF METAL COATING FROM DIELECTRIC MATERIAL

The present invention relates to a process and a device for locally removing the metal coating from a strip of dielectric material and it finds a particularly important application, although not exclusive, in the manufacture of capacitors using a thin ribbon of dielectric material metallized on one face.

It is known that some types of capacitor are produced by rolling up ribbons of dielectric material, generally plastic, coated with a very thin metal layer. These ribbons are manufactured by vacuum evaporation while reserving the required non metallized zones, particularly in the form of lateral margins.

In accordance with one aspect of the invention, a Corona discharge is established between the coating and an electrode with a degree of curvature placed opposite the zone in which the coating is to be removed.

The application of the process of the invention to the manufacture of capacitors enables manufacture to start from a strip or a ribbon metallized over the whole of its surface, which may be produced much more easily than if insulating zones had to be reserved. By means of the Corona discharge, insulating zones are then obtained which may be defined very accurately on the starting strip and the operation may be effected in the open air, so in a simple way.

A device according to another aspect of the invention comprises a support for receiving said strip and giving it a small or zero curvature, electrode means having a high curvation portion confronting the position for receiving the strip on the support, a high curvature, a current-return electrode arranged to be in contact with the coating and means for establishing, between the first electrode and the coating, a voltage difference causing a current to flow by Corona effect between the electrode and the coating.

The strip may be processed continuously, the strip travelling past the electrode means creating the Corona discharge. The electrode means may have different forms. There may in particular be used a single metal point, an array of points or a blade whose slope in relation to the direction of travel is selected to achieve the results desired. The end edge of the blade may be parallel to the strip. In some cases, where it is desired to obtain shapes of varying width, the edge may be on the contrary sloping with respect to the plane of the support of the strip.

The invention will be better understood from reading the description which follows of devices which form particular embodiments thereof, as well as of the process using same. The description refers to the accompanying drawings in which.

DETAILED DESCRIPTION OF PARTICULAR EMBODIMENTS

Figure 1:
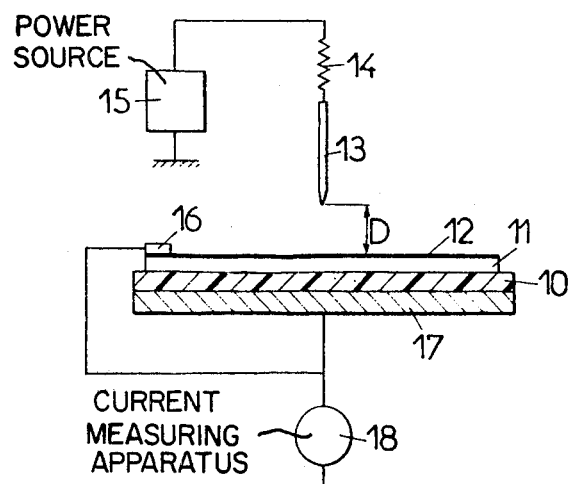
FIG. 1 is a simplified diagram showing a device using an electrode in the shape of a point.

The device shown in FIG. 1 (where the thicknesses are very exaggerated for the sake of clarity) comprises a support 10, advantageously made from a good heat-conducting dielectric material, intended to receive strip 11 having a metal coating 12 to be removed locally. Good contact between support 10 and strip 11 improves the holding of this latter. Such a contact is obtained by using for instance a support made from polished beryllium oxide so as to facilitate heat transfer.

The electrical circuit for creating the Corona discharge comprises an electrode 13 in the form of a point connected, by means of a current-limiting resistor 14, to one of the poles of a DC voltage source 15. A current-return electrode 16, connected to the metal coating 12, is connected to the other pole of source 15, possibly through earth. Support 10 itself is advantageously carried by a counter-electrode 17 also connected to earth. An apparatus 18 for measuring the value of the current may be inserted in the circuit.

The different components of the device must be provided so as to establish a Corona discharge. In practice, the end part of the point will have a radius of curvature between 1 and 100 microns and will be situated at a distance D between 0.1 and 10 mm from strip 11. The high-voltage source 15 will have to cause a current greater than 20 $\mu$A to pass between electrode 13 and the coating.

The result obtained will be different according to as to whether the electrode 13 is positive or negative with respect to coating 12.

If the point is positive, the metal is stripped in a zone with a clean edge, without damage to the ribbon as long as the current does not exceed a value which is of the order of 100 $\mu$A for current materials. The stripping action is the following: a discharge appears between the tip of electrode 13 and the nearest part of the coating and removes some metal. The discharge then extends to those points of the coating which are then the closest to the point and so on until a circular zone has been formed if strip 11 is motionless.

If on the contrary the point is negative, there is oxidization of the coating metal in a zone which presents a gradual shading off.

It may be pointed out that particularly satisfactory results are obtained on a strip of dielectric material formed by a polymer coated with a thin metal layer by means of an electrode in the form of a metal point having an end radius of curvature between 1 and 50 microns and an angle at the apex of about 17°, whose end is spaced 1 mm from the strip. Source 15 supplies a voltage of a few kilovolts and resistor 14 has a value of a few Megohms.

In a modified embodiment, a return electrode 16 is used which is not directly in contact with coating 12 but has a structure similar to that of electrode 13: there is obtained simultaneously a demetallized zone and a zone in which the coating metal is oxidized.

Electrode 13 in the form of a point may be replaced by a thin blade whose end edge again has a small radius of curvature. In this case, an elongated demetallized zone may be obtained. If the distance from the edge to the strip is not constant over the whole length of the edge, the demetallized zone assumes the shape of a drop of water, the widest part being opposite the part of the edge closest to the strip. The current acceptable in the electrode is then greater than that of an electrode in the shape of a point: in the case of a curvature of the same order as that indicated above for a point, a current may be admitted of the order of 1 mA for 10 cm of length.

It may be mentioned by way of example that a positive point under Corona conditions enables 500 coulombs to be extracted per m² for a layer of aluminum of 190 Å in thickness on a strip of polymer material.

Several points may of course be provided and located along any selected path.

The embodiment illustrated in FIG. 1 is for continuous treatment of a strip 11, 12. It again comprises a high-voltage source 15a supplying the electrodes creating the Corona effect. These electrodes 13a are formed from a series of thin blades parallel to the travel direction or oblique with respect to the direction. The insulating support is here formed by a drum or cylinder 10a driven in rotation and the current-return electrodes are formed by metal change-of-direction rollers 16a. Electrodes 13a are distributed angularly about the axis of drum 10a, at a distance which may be constant or which diminishes in the travel direction of the strip. All electrodes 13a are supplied from a same bar 19, through current-limiting resistors, not shown.

Figure 2:
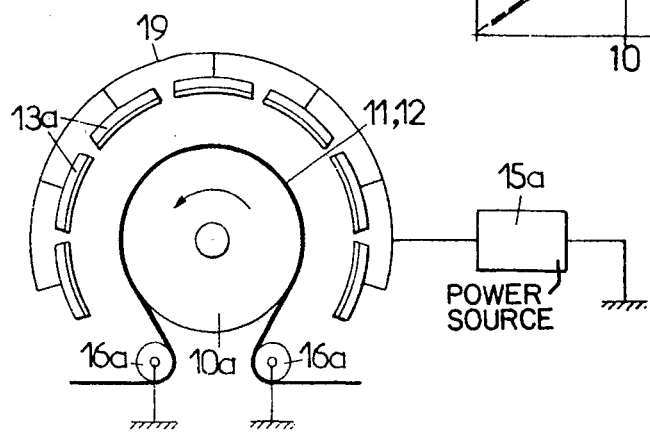
FIG. 2 is a simplified diagram of a device forming a variation of that of FIG. 1, using blade-shaped electrodes and enabling a strip of ribbon of great length to be treated.

The device shown in FIG. 2 may be used in particular for removing the metal coating along lateral margins of the strip, with a view to manufacturing capacitors, and/or for forming insulating oxidized zones.

The most important factor determining the quantity of metal which is removed from the strip is energy W spent in the form of charge transfer q, i.e. $W = q.V$; with $D < 0.1$ mm, operation with a voltage of a few 100 volts and a current of a few tens of $\mu A$ will be sufficient to achieve metal removal; the required power for striking Corona discharge will then be typically higher than 1 Watt and lower than 10 Watts.

Figure 3:
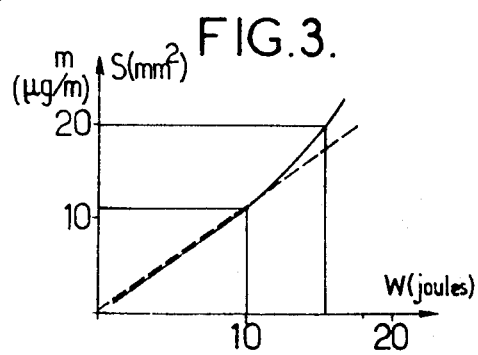
FIG. 3 is a diagram showing the variation in metal removal as a function of energy.

The curve in full line in FIG. 3 indicates the area of coating S which is removed as a function of energy W and results from tests on a polyterephtalate sheet 12 $\mu m$ thick having an aluminum coating 290 Å thick, whith different distances D, from 0.1 to 1 mm.

The curve in dotted line results from tests on the same sheet with a unit similar to that of FIG. 2, however with a point electrode and is a representation of mass m removed per linear meter as a function of W.

We claim:

1. A process for locally demetallizing a metal coating on a strip of dielectric material, comprising the steps of moving said strip along a predetermined path while maintaining said coating in contact with a current return electrode held at a reference potential and while supporting the side of said strip opposite from said coating with a support means held at said reference potential, and applying, to discharge electrode means closely confronting said coating and having a high curvature portion of much greater curvature than that of the portion of said strip which confronts said coating, a DC electrical voltage adapted to maintain a Corona discharge between said discharge electrode means and said coating, whereby demetallization occurs along a predetermined defined zone of said strip as the latter is moved, without damaging said dielectric material.

2. A process according to claim 1, wherein the strip is moved past the discharge electrode means to remove the coating along a line.

3. A process according to claim 1, wherein the electrode means are brought to a positive voltage with respect to the coating so as to strip the coating locally.

4. A process according to claim 1, wherein the strip is supported and driven by low curvature means made from dielectric thermally conducting material.

5. A process according to claim 1, wherein said electrical voltage is negative with respect to said coating so as to demetallize said coating by oxidizing it locally.

* * * * *